US007160040B2

(12) United States Patent
Matsushima

(10) Patent No.: US 7,160,040 B2
(45) Date of Patent: Jan. 9, 2007

(54) IMAGE PROCESSING METHOD AND IMAGE PROCESSING SYSTEM

(75) Inventor: Noriyuki Matsushima, Edogawa-ku (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 11/224,140

(22) Filed: Sep. 13, 2005

(65) Prior Publication Data
US 2006/0280537 A1 Dec. 14, 2006

(30) Foreign Application Priority Data
Jun. 10, 2005 (JP) ............................. 2005-170683

(51) Int. Cl.
*B41J 5/30* (2006.01)
(52) U.S. Cl. ............................. 400/62; 400/61; 400/70; 400/76; 358/1.15; 358/1.9
(58) Field of Classification Search ............ 400/60–62, 400/70, 76; 358/1.15–1.18, 1.9
See application file for complete search history.

(56) References Cited

U.S. PATENT DOCUMENTS 6,441,915 B1 * 8/2002 Imaizumi et al. .......... 358/1.15
6,473,197 B1 * 10/2002 Shimazaki .................. 358/1.9
6,556,793 B1 * 4/2003 Nakamura .................... 399/15
6,836,344 B1 * 12/2004 Koide et al. ................ 358/1.9

FOREIGN PATENT DOCUMENTS

JP 2003-122542 4/2003

* cited by examiner

*Primary Examiner*—Minh Chau
(74) *Attorney, Agent, or Firm*—Buchanan Ingersoll & Rooney PC

(57) ABSTRACT

Disclosed is a printing system comprising a printing device and a printing control device. The printing device makes a judgment as to whether it is necessary to correct a profile, which is information concerning reproduction characteristics of print data, and, if it is judged that the profile correction is necessary, the printing device outputs a predetermined standard chart, measures the output result using an image measuring unit provided on the printing device, calculates a differential profile, i.e., correction data, based on the measurement result, and transmits the calculated differential profile to the printing control device. The printing control device correct the profile based on the differential profile received from the printing device.

10 Claims, 10 Drawing Sheets

IMAGE PROCESSING METHOD AND IMAGE PROCESSING SYSTEM

CROSS-REFERENCE TO RELATED APPLICATION

This application is based on Japanese Patent Application No. 2005-170683 filed with Japan Patent Office on Jun. 10, 2005.

BACKGROUND OF THE INVENTION

1. Field of the Invention

The present invention relates to an image processing method and an image processing system, in particular, to an image processing method and an image processing system in case of correcting information concerning reproduction characteristics of print data.

2. Description of Related Art

The color reproduction characteristics of print data on a printing device such as an MFP (Multi-Function Peripheral) changes with the elapse of time and varies from one apparatus to another (machine difference). The following two methods have been known as automatic color correction functions for absorbing such a chronological change or machine differences of the reproduction characteristics.

The first method is a method in which the printing device automatically executes color correction in order to achieve a constant color reproduction characteristics at all times taking consideration of environment and durability effects based on the values of temperature and humidity sensors and a usage frequency counter.

The second method is to scan a test chart provided by a printing device using a measuring device, and add a profile, which is information concerning color reproduction characteristics generated from the scanning result using another tool, to a printing control device, so that the printing control device can apply color corrections to the print data using the updated profile (Unexamined Publication No. JP-A-2003-122542).

However, when the printing control device updates the profile and executes color correction in the first method mentioned above, the print data may be color-corrected for the second time by the printing device after it is corrected once by the print control device so that the color of the output from the printing device may end up different from the targeted color. For example, the "white" portion in the print data may become unable to hold the "white" value and may get colored due to differences in the method of treating "whiteness" and calculation errors when it goes through a multiple times of color correction.

On the other hand, the second method mentioned above had a problem that it was incapable of correctly reflecting the changes of conditions such as environment and durability of the printing device on the color correction.

OBJECTS AND SUMMARY

It is an object of the present invention to provide an image processing method and an image processing system, which are improved for solving the abovementioned problems.

It is another object of the present invention to provide an image processing method and an image processing system, which are capable of properly and efficiently correcting the information concerning reproduction characteristics of the print data while reflecting the condition of the printing device.

According to an embodiment of the invention, there is provided an image processing method comprising the steps of: 1) making, by a printing device, a judgment as to whether any correction of information concerning reproducing characteristics of print data is necessary or not; 2) outputting, from said printing device, a preset image when it is judged that it is necessary to correct the information concerning the reproduction characteristics in the step 1); 3) measuring, by said printing device, the output result in the step 2) using a measuring unit provided on said printing device; 4) calculating, by said printing device, correction data based on the measurement result in the step 3); 5) transmitting said correction data calculated in the step 4) from said printing device to a printing control device; and 6) correcting, by said printing control device, information concerning the reproduction characteristics based on said correction data received from said printing device.

According to another embodiment of the invention, there is provided an image processing system, comprising: a printing control device for transmitting print data; and a printing device for printing the print data received from the printing control device, said printing device including: a first communication unit for communicating with said printing control device; an output unit for outputting preset image when it is judged that correction of information concerning reproduction characteristics of print data is necessary; a measuring unit for measuring a result outputted by said output unit; and a first control unit for calculating correction data based on the result measured by said measuring unit and transmitting the calculated correction data to the printing control device via said first communication unit, said printing control device including: a second communication unit for communicating with said printing device; and a second control unit for correcting the information concerning reproduction characteristics based on said correction data received from said printing device via said second communication unit.

The objects, characteristics and properties of this invention other than those set forth above will become apparent from the description given herein below with reference to preferred embodiments illustrated in the accompanying drawings.

DETAILED DESCRIPTION OF PREFERED EMBODIMENTS

The embodiment of this invention will be described below with reference to the accompanying drawings.

Figure 1:
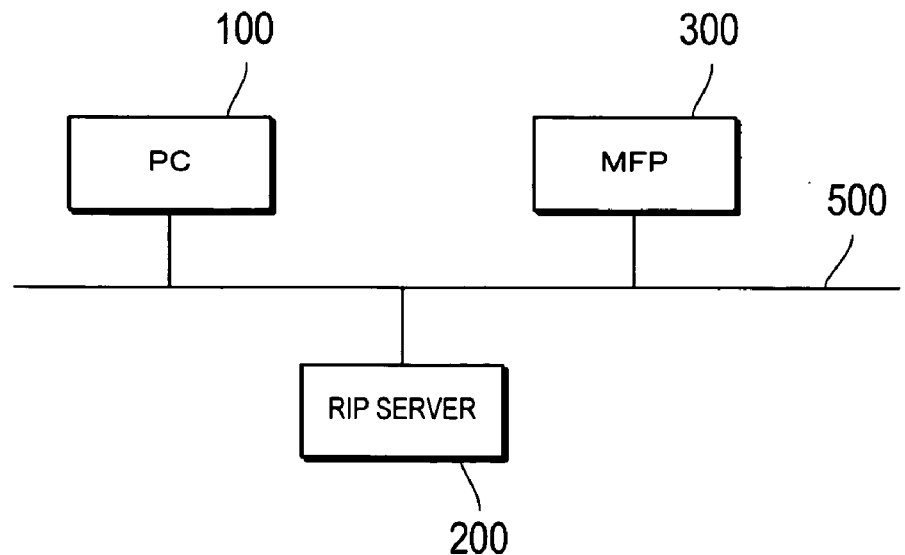
FIG. 1 is a block diagram showing the overall constitution of an image processing system according to an embodiment of the present invention.

FIG. 1 is a block diagram showing the overall constitution of an image processing system according to an embodiment of the present invention.

The image processing system is equipped with a PC (personal computer) 100, a RIP server 200 that serves as a printing control device, and an MFP 300 that serves as a printing device, which are interconnected via a network 500 communicably with each other. The network 500 can be a LAN connecting computers and network equipment according to standards such as Ethernet®, Token Ring, and FDDI, or a WAN that consists of several LANs connected by a dedicated line.

The RIP server 200 and the MFP 300 can be directly connected between them. Moreover, the types and the number of equipment to be connected to network 500 are not limited to those shown in FIG. 1.

The PC 100 has applications for generating and editing document files installed. The PC 100 transmits to the RIP server 200 print data based on a document file instructed to be printed on an application.

Figure 2:
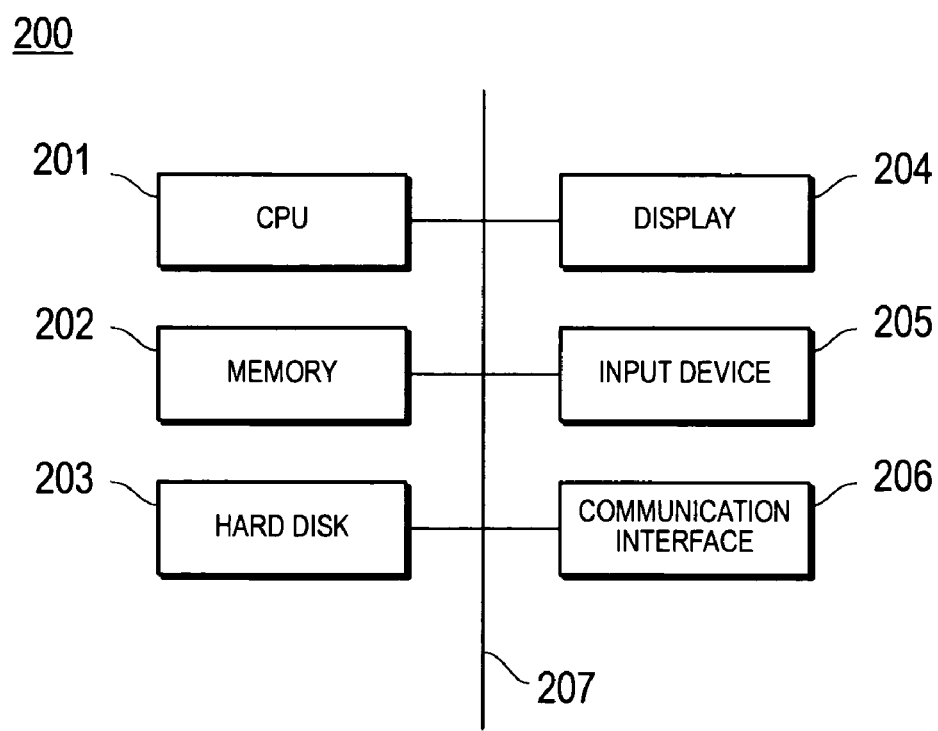
FIG. 2 is a block diagram showing the hardware constitution of a RIP server.

FIG. 2 is a block diagram showing the hardware constitution of the RIP server 200.

The RIP server 200 has a CPU 201, a memory 202, a hard disk 203, a display 204, an input device 205, and a communication interface 206, all of which are interconnected via a bus 207 for exchanging signals. The RIP server 200 is realized by using a workstation or a PC in general.

The CPU 201 controls various parts indicated above and executes various arithmetic processes according to a program. The memory 202 stores programs and data temporarily as a working area. The hard disk 203 stores various programs including an operating system and data.

Display 204 is typically a liquid crystal display and displays various kinds of information. The input device 205 consists of a pointing device such as a mouse, a keyboard, and others, and is used for making various kinds of inputs. The communication interface 206 is typically a LAN card and is used for communicating with external equipment via a network 500.

Figure 3:
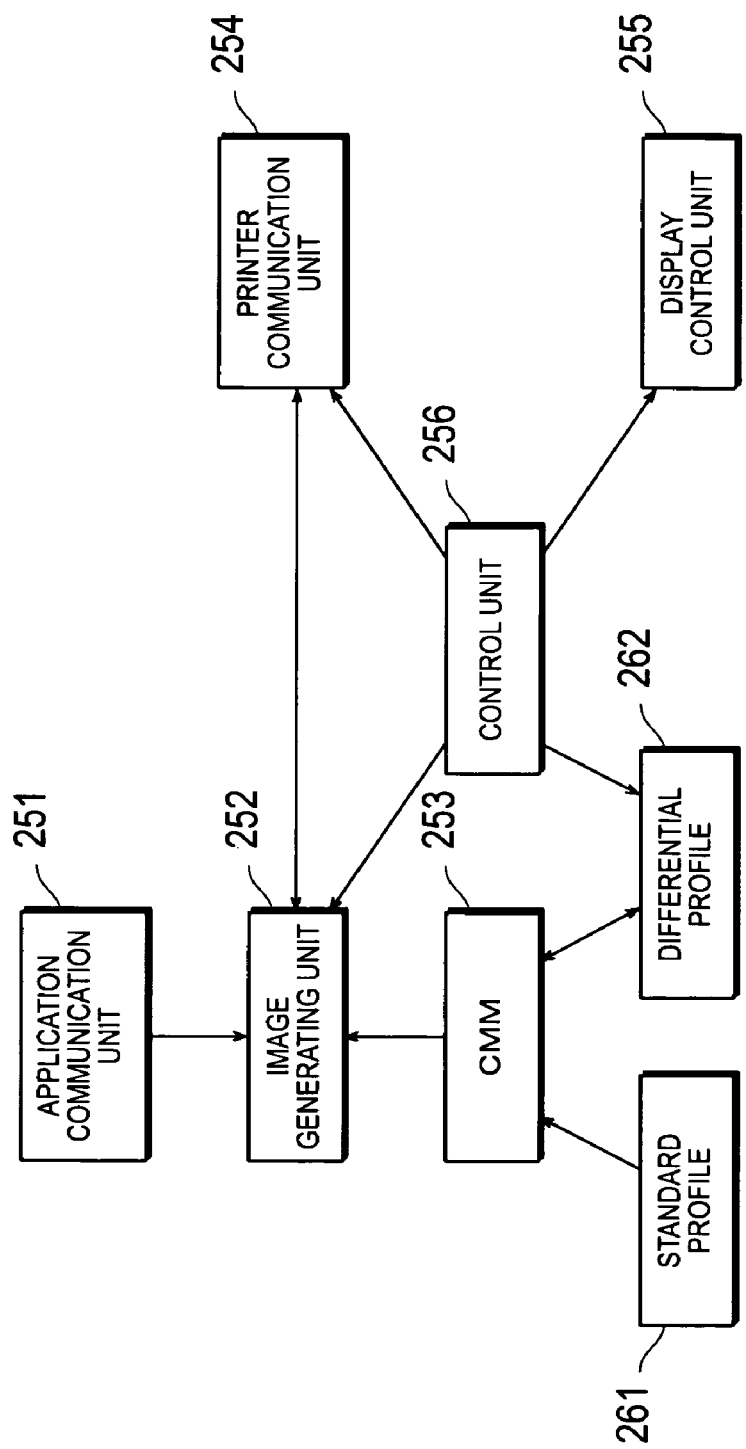
FIG. 3 is a block diagram showing the functions of the RIP server.

FIG. 3 is a block diagram showing the functions of the RIP server 200.

The RIP server 200 has an application communication unit 251, an image generating unit 252, a CMM (Color Management Module) 253, a printer communication unit 254, a display control unit 255, and a control unit 256, and the functions of these are activated as the CPU 021 retrieves the corresponding programs stored in the hard disk 203 onto the memory 202 and executes them. The hard disk 203 has the areas for storing a standard profile 261 and a differential profile 262 respectively.

The application communication unit 251 receives print data generated by an application program operating on the PC 100. The image generating unit 252 converts the print data received by the application communication unit 251 using color conversion (color correction) function of the CMM 253 into print data (raster data) in a bitmap format that can be understood by the MFP 300. The CMM 253 is a module for converting the print data, simultaneously when it is converted into data in a bitmap format, into appropriate colors applying a profile obtained by synthesizing the standard profile 261 and the differential profile 262. The CMM 253 is called from the image generating unit 252.

The printer communication unit 254 is in charge of communication with the MFP 300. The display control unit 255 controls the screen image on the display 204.

The control unit 256 manages the entire operation of the RIP server 200. For example, when the application communication unit 251 receives print data, the control unit 256 inquires the MFP 300 about the necessity of profile correction, and updates the differential profile 262 and instructs the operations of the image generating unit 252 thereafter depending on the response to the inquiry.

The standard profile 261 holds the standard color characteristics of the MFP. The standard profile 261 is provided per each model of the MFP. The profile here means information concerning the color reproducing characteristics of print data and is given by the output graph relative to the input. The profile of the present embodiment is constituted as a conglomeration of profiles for each color. The differential profile 262 is a profile showing the differences from the standard profile 261. In other words, the differential profile 262 holds data that indicates how much the actual output color of the MFP deviates from the standard profile 261. This differential profile 262 is calculated on the MFP side and is used for the purpose of absorbing chronological changes and machine difference of the color reproducing characteristics.

Figure 4:
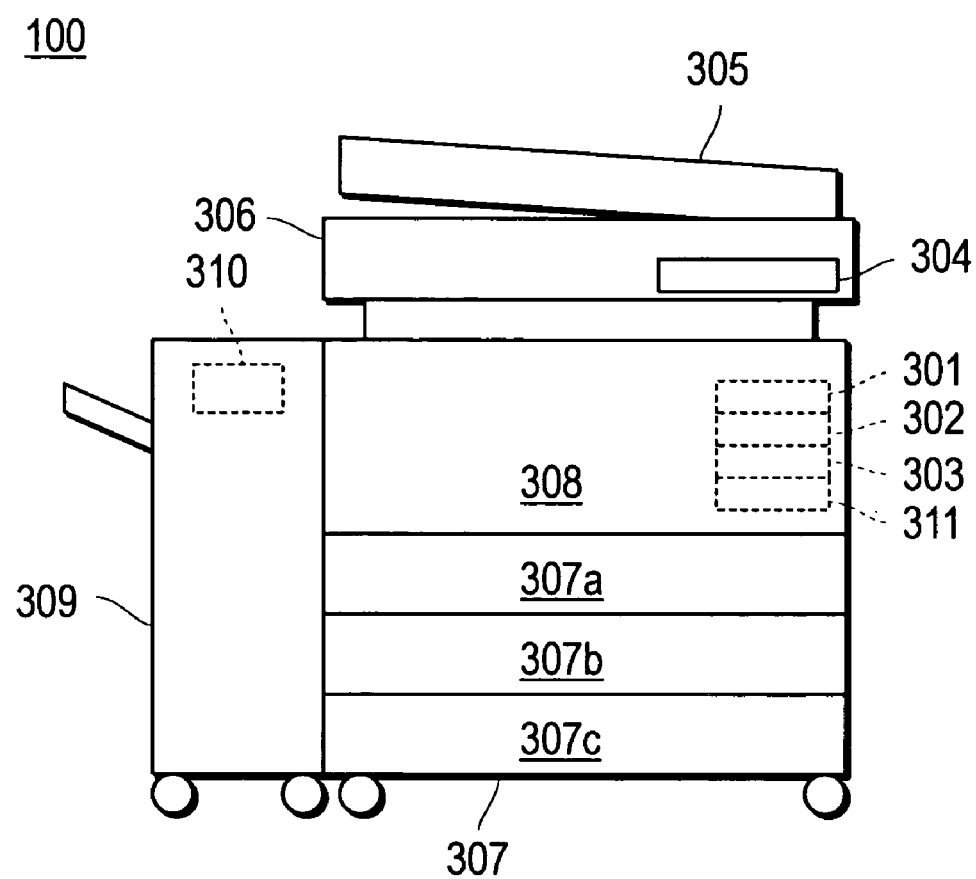
FIG. 4 is a schematic front view of an MFP.
Figure 5:
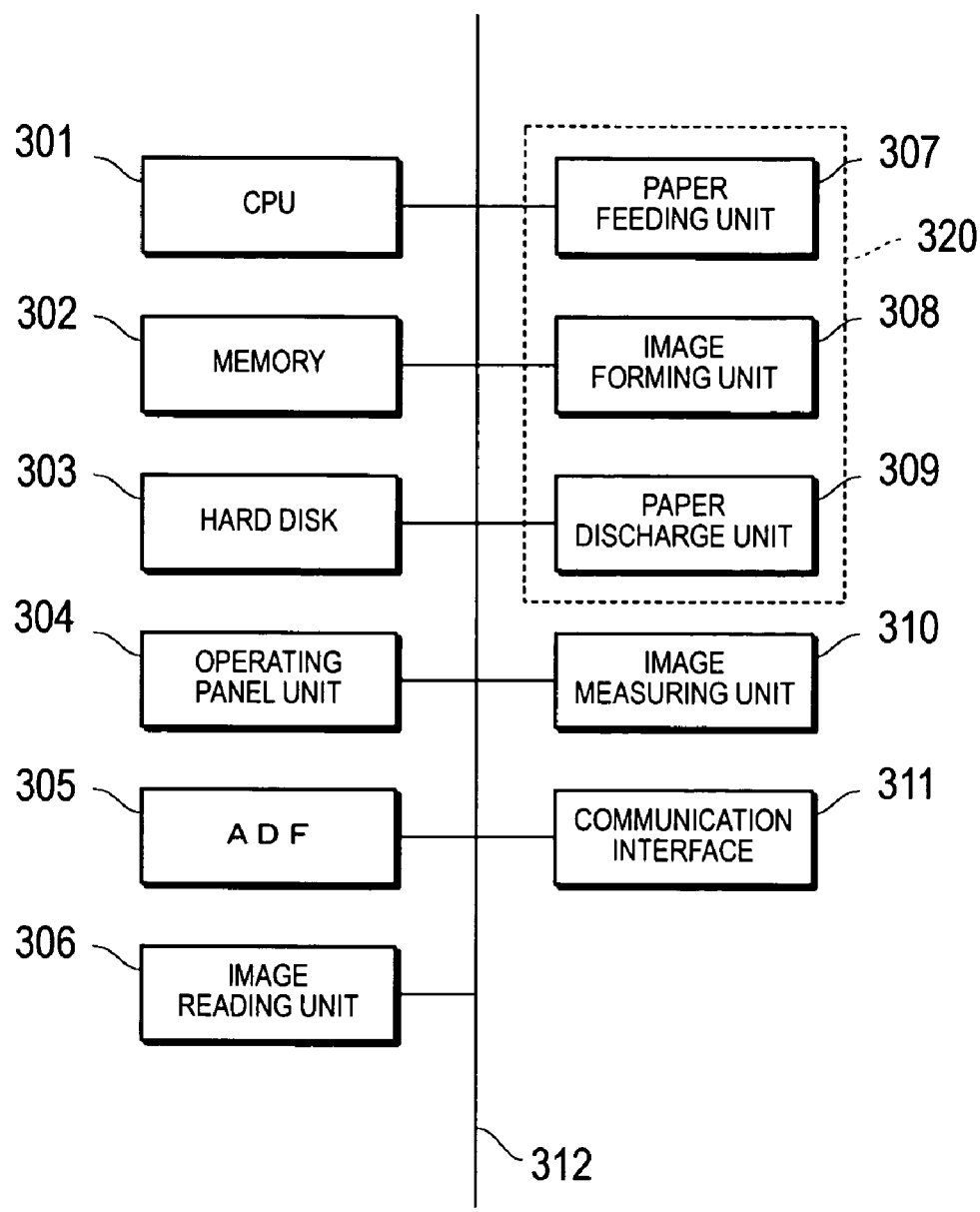
FIG. 5 is a block diagram showing the hardware constitution of the MFP.

FIG. 4 is a schematic front view of the MFP 300, and FIG. 5 is a block diagram showing the hardware constitution of the MFP 300.

The MFP 300 has a CPU 301, a memory 302, a hard disk 303, an operating panel unit 304, an ADF (Auto Document Feeder) 305, an image reading unit 306, a paper feeding unit 307, an image forming unit 308, a paper discharge unit 309, an image measuring unit 310, and a communication interface 311, all of which are interconnected via a bus 312 for exchanging signals. The descriptions of those parts of the MFP 300 that have the same functions as those of the corresponding parts of the RIP server 200 will be omitted here to avoid being duplicative.

The operating panel unit 304 consists of a touch panel, a ten-key pad, a start button, a stop button and others to be used for displaying various kind of informatin and entering various instructions.

The ADF 305 transports a single or multiple sheets of paper one sheet at a time to a specified reading position of the image reading unit 306, and discharges the document sequentially after reading it.

The image reading unit 306 irradiates a document set on the specified reading position or transported to the specified reading location by the ADF 305 with a light source such as a fluorescent lamp and the like, converts reflected lights from the document surface into electrical signals with the help of light sensitive devices such as a CCD image sensor, and generates image data from the electrical signals.

The paper feeding units 307a through 307c contain papers which are used as recording media in the printing process. The paper feeding unit 307 (integral name for 307a through 307c) feeds the contained paper to the image forming unit 308 one sheet at a time. The image forming unit 308 prints various data on paper using a known imaging process such as the electronic photographing process including such processes as electrical charging, exposure, developing, transferring and fixing. The paper discharge unit 309 discharges printed paper transported from the image forming unit 308 onto the paper discharge tray. The paper feeding unit 307, the image forming unit 308 and the paper discharge unit 309 constitute a drawing unit 320 that is in charge of printout.

The image measuring unit 310 measures the output result of the standard chart 363 (see FIG. 6) stored in the hard disk 303. The image measuring unit 310 is a spectral calorimeter built into the MFP 300.

Figure 6:
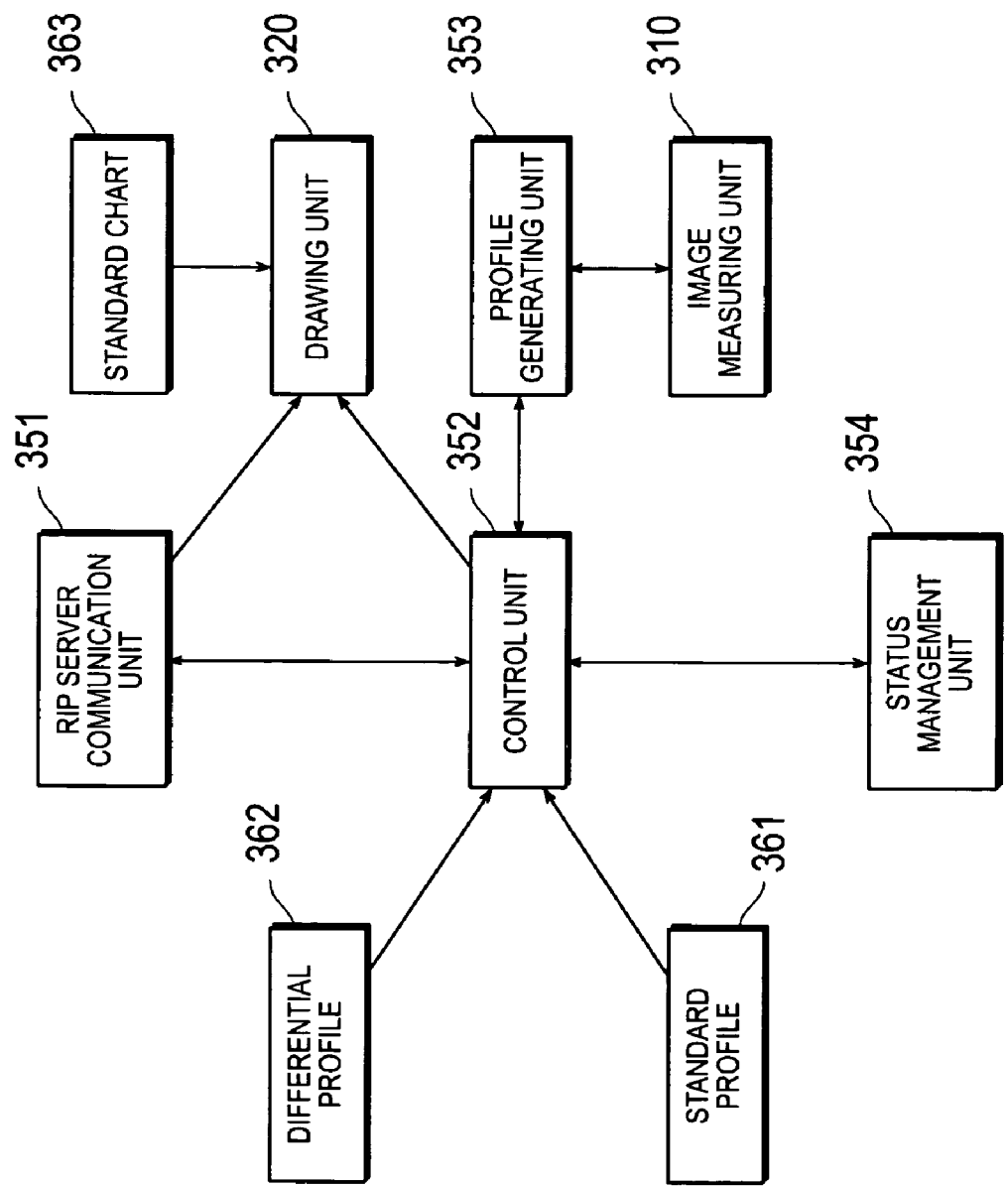
FIG. 6 is a block diagram showing the functions of the MFP.

FIG. 6 is a block diagram showing the functions of the MFP 300.

The MFP 300 has a RIP server communication unit 351, a control unit 352, a profile generating unit 353, and a status management unit 354, and the functions of these units are activated as the CPU 301 retrieves the corresponding programs stored in the hard disk 303 onto the memory 302 and executes them. The hard disk 303 has the areas for storing a standard profile 361, a differential profile 362, and the standard chart 363 respectively.

The RIP server communication unit 351 is in charge of communications with the RIP server 200.

The control unit 352 manages the entire operation of the MFP 300. For example, the control unit 352 receives an inquiry about the necessity of profile correction from the RIP server 200 through the RIP server communication unit 351, makes a judgment whether the need for updating the differential profile 362 exists or not based on the information managed by the status management unit 354, and makes an instruction for acquiring the differential profile 362 if necessary.

The standard profile 361 and the differential profile 362 are identical to the standard profile 261 and the differential profile 262 stored in the RIP server 200.

The standard chart 363 is a chart outputted by the image measuring unit 310 for the purpose of being used for its measurement and is stored as electronic data.

Figure 7:
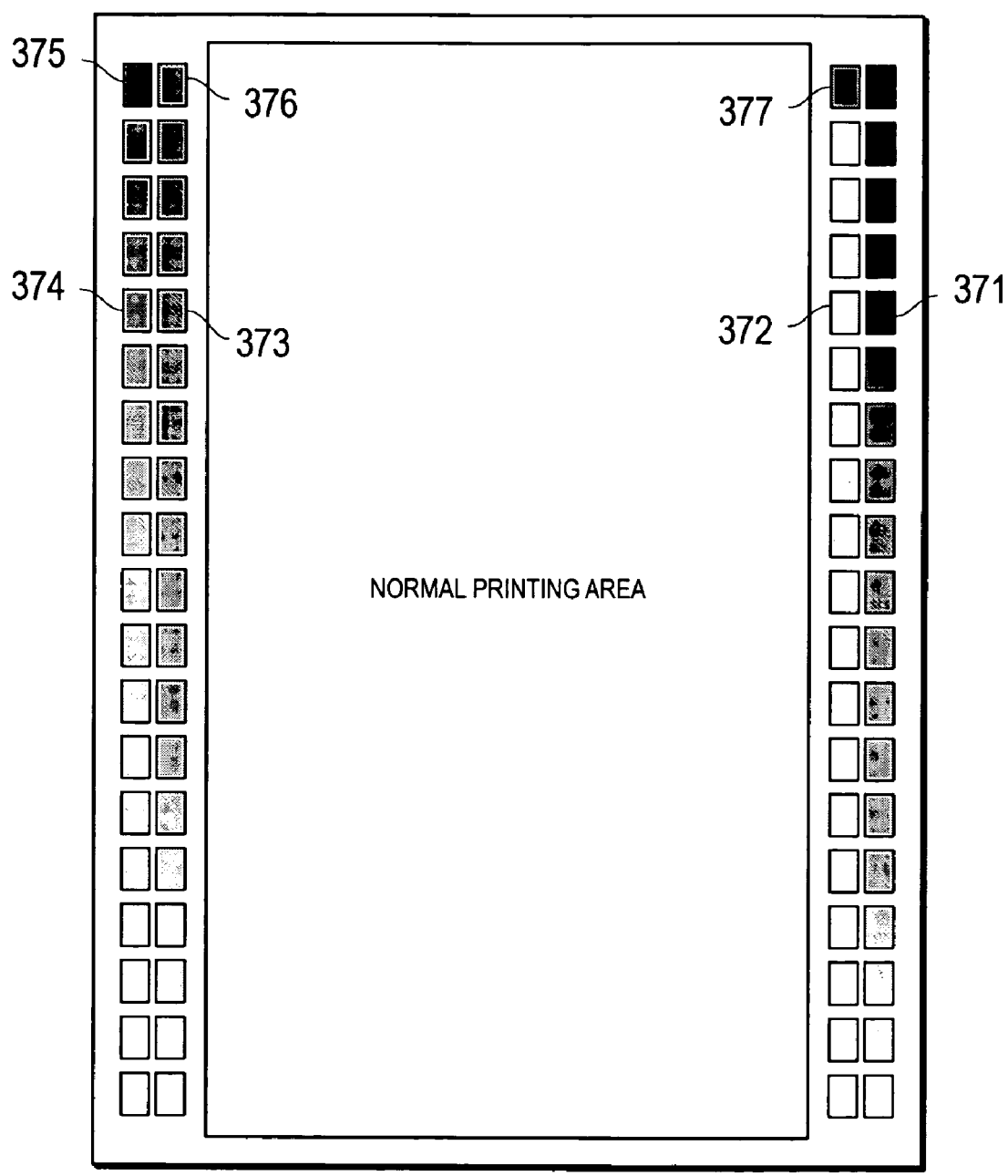
FIG. 7 shows an example of a standard chart.

FIG. 7 shows an example of a standard chart. The standard chart 363 is preferably one that can be used for calculating a differential profile with a minimum amount of calculation when the updating of the differential profile is desired. The standard chart 363 does not have to have a format shown in FIG. 7 and can be anything as long as it is detectable by the image measuring unit 310. The standard chart 363 has K sample patches 371, Y sample patches 372, M sample patches 373, and C sample patches 374 of the basic four printing color elements, K, Y, M, and C, each of which consists of a plurality of samples varying only in density (lightness) with a fixed spacing between them, as well as an R sample patch 375, a G sample patch 376, and a B sample patch 377, each of which is a combination of two out of three colors C, M, and Y (secondary color). By outputting such a standard chart 363, important places of the total color space can be measured to make the overall color correction possible.

The profile generating unit 353 calculates color variations or deviations based on the difference between the data obtained by measuring the output result of the standard chart by the image measuring unit 310 and the standard profile 361 to generate the differential profile 362.

The status management unit 354 grasps the factors related to the print data that affect the color reproduction characteristics, in other words, the factors that relate to the color variation of the MFP 300 and manages the information for judging whether there is a need to correct the profile or not in response to an inquiry from the control unit 352.

The RIP server 200 and the MFP 300 can each contain constitutional elements other than those described above, or may lack a portion of the above-mentioned elements.

Figure 8:
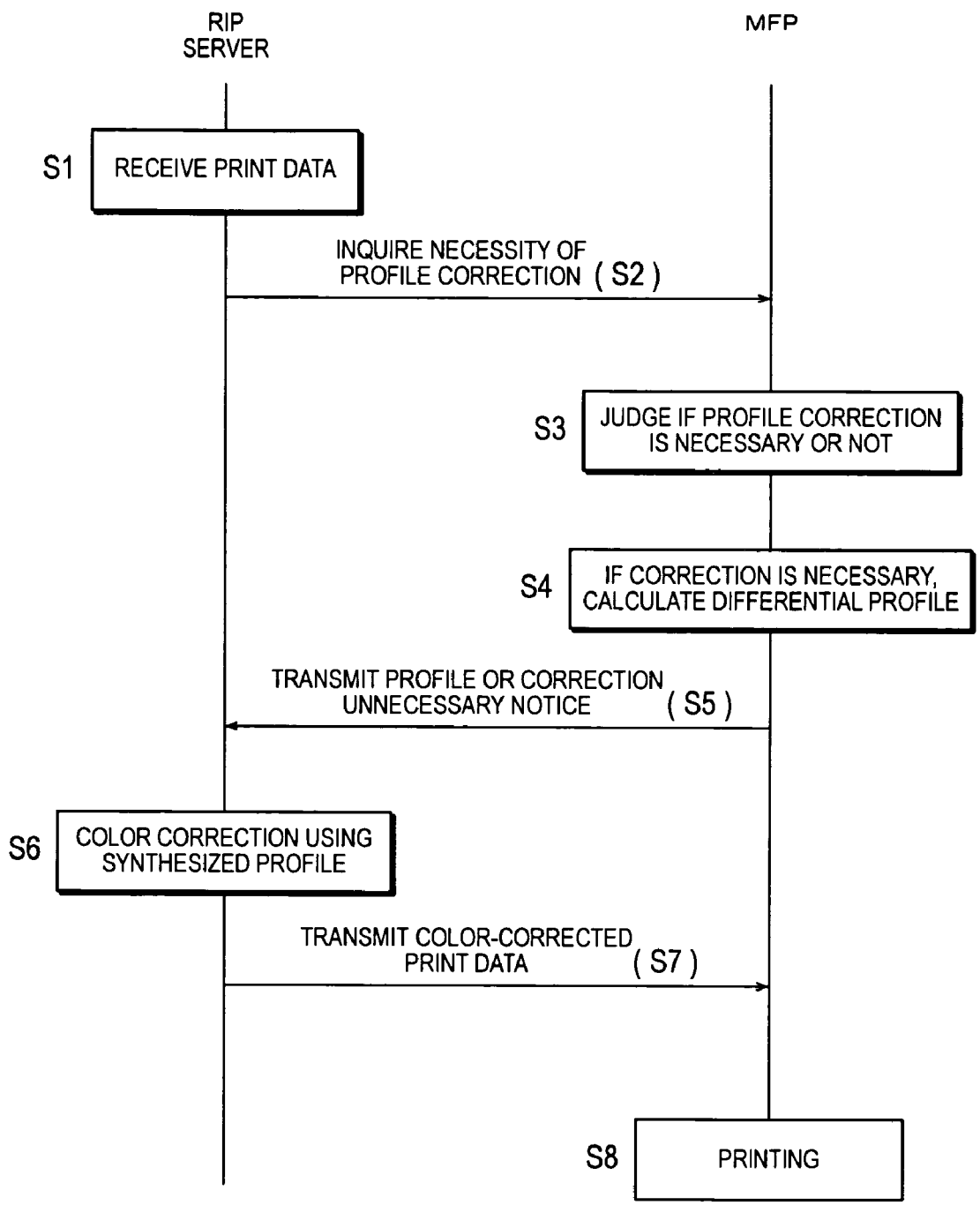
FIG. 8 shows the schematic sequence of the operation on the image processing system.

Next, let us describe the schematic sequence of the operation on the image processing system with reference to FIG. 8.

First, the RIP server 200 receives print data from, for example, the PC 100 (step S1), and inquires the MFP 300 whether it is necessary to correct the profile or not (step S2). Next, the MFP 300 makes a judgment whether it is necessary to correct the profile or not depending on the internal condition of the MFP 300 (step S3). If the MFP 300 judges that the correction of the profile is necessary, the MFP 300 calculates the differential profile 362 depending on the standard profile 361 held internally in advance and the measurement result by the image measuring unit 310 (step S4). Next, the MFP 300 transmits the calculated differential profile 362 to the RIP server 200 if the correction of the profile is necessary, or transmits a notice that no correction is needed (step S5) if no correction of the profile is necessary.

The RIP server 200 then executes color correction (color conversion) on the print data using a profile obtained by synthesizing the standard profile 261 and the differential profile 262 (step S6). If, at this point, a differential profile 362 is received from the MFP 300, the RIP server 200 uses the differential profile 262, which is updated to the same contents as the received differential profile 362. Next, the RIP server 200 transmits the color-corrected print data to the MFP 300 (step S7). The MFP 300 prints the received, color-corrected, print data on paper (step S8).

The operation of the RIP server 200 in this embodiment will be described in the following.

Figure 9:
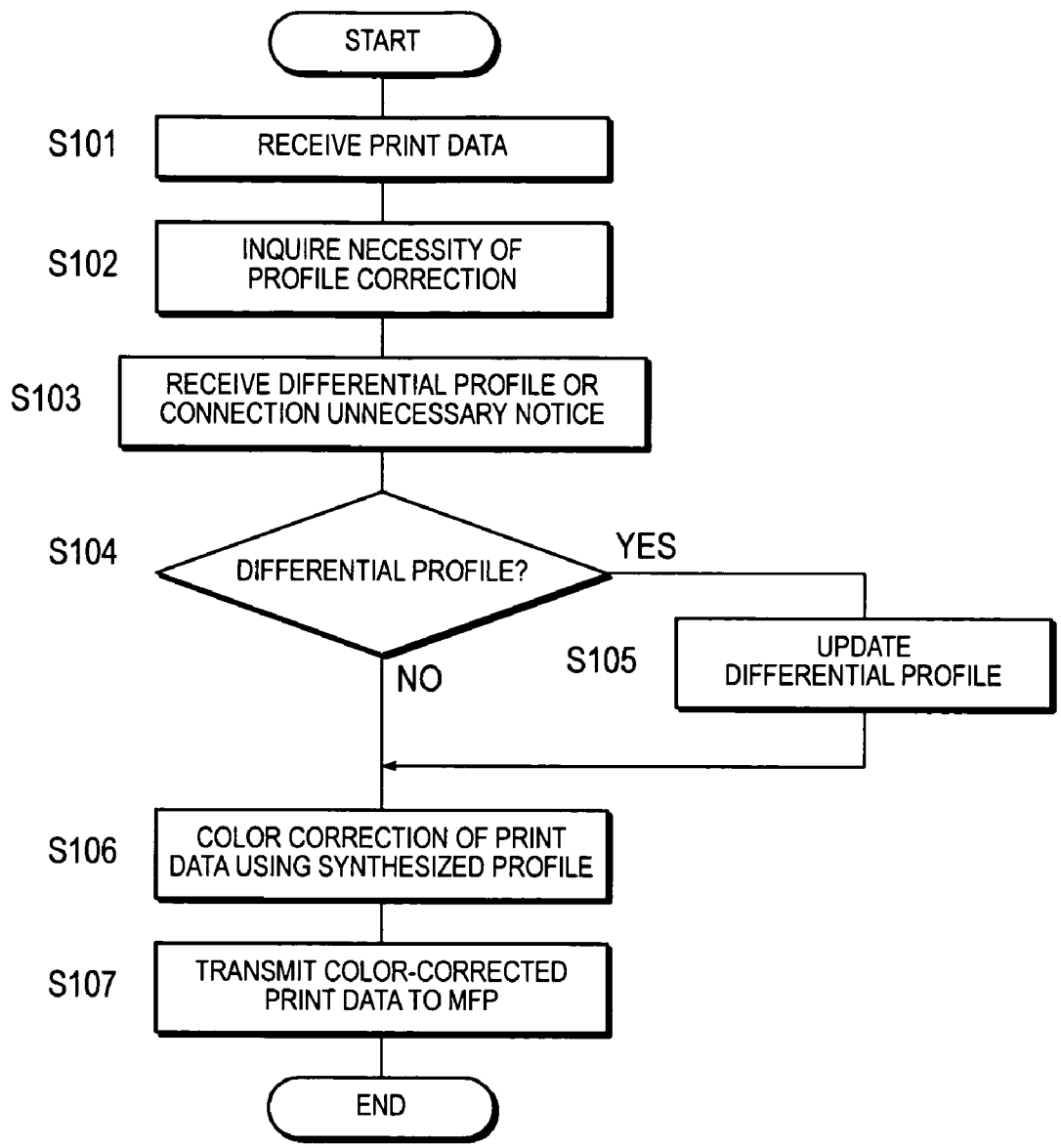
FIG. 9 is a flowchart showing the sequence of the process on the RIP server.

FIG. 9 is a flowchart showing the sequence of the process on the RIP server 200. The algorithm shown in the flowchart of FIG. 9 is stored as a program in the hard disk 203 of the RIP server 200 and executed by CPU 201.

First, the RIP server 200 receives, for example, the print data generated by an application of the PC 100 (step S101). The receiving of the print data here means the reception of a printing instruction.

As the print data is received, the RIP server 200 inquires the MFP 300, prior to the execution of printing, whether it is necessary to correct the profile or not (step S102).

Next, the RIP server 200 receives as a response from the MFP 300 the differential profile 362 for correcting the profile or a notice stating that no correction is necessary (step S103).

In the step S104, a judgment is made as to whether what is received from the MFP 300 is the differential profile 362 or not. If what is received from the MFP 300 is not the differential profile 362 but a notice stating that no correction is necessary (step S104: No), the program advances to the step S106.

On the other hand, if what is received from the MFP 300 is the differential profile 362 (step S104: Yes), the differential profile 262 held in the RIP server 200 is updated to the same contents as the differential profile 362 received from the MFP 300 (step S105).

The RIP server 200 prepares a profile obtained by synthesizing the differential profile 262 with the standard profile 261 (having the same contents as the standard profile 361) held in the RIP server 200, and executes color correction on the print data received in the step S101 using the synthesized profile (step S106). Next, the RIP server 200 transmits the color-corrected print data to the MFP 300 (step S107).

The operation of the MFP 300 in this embodiment will be described in the following.

Figure 10:
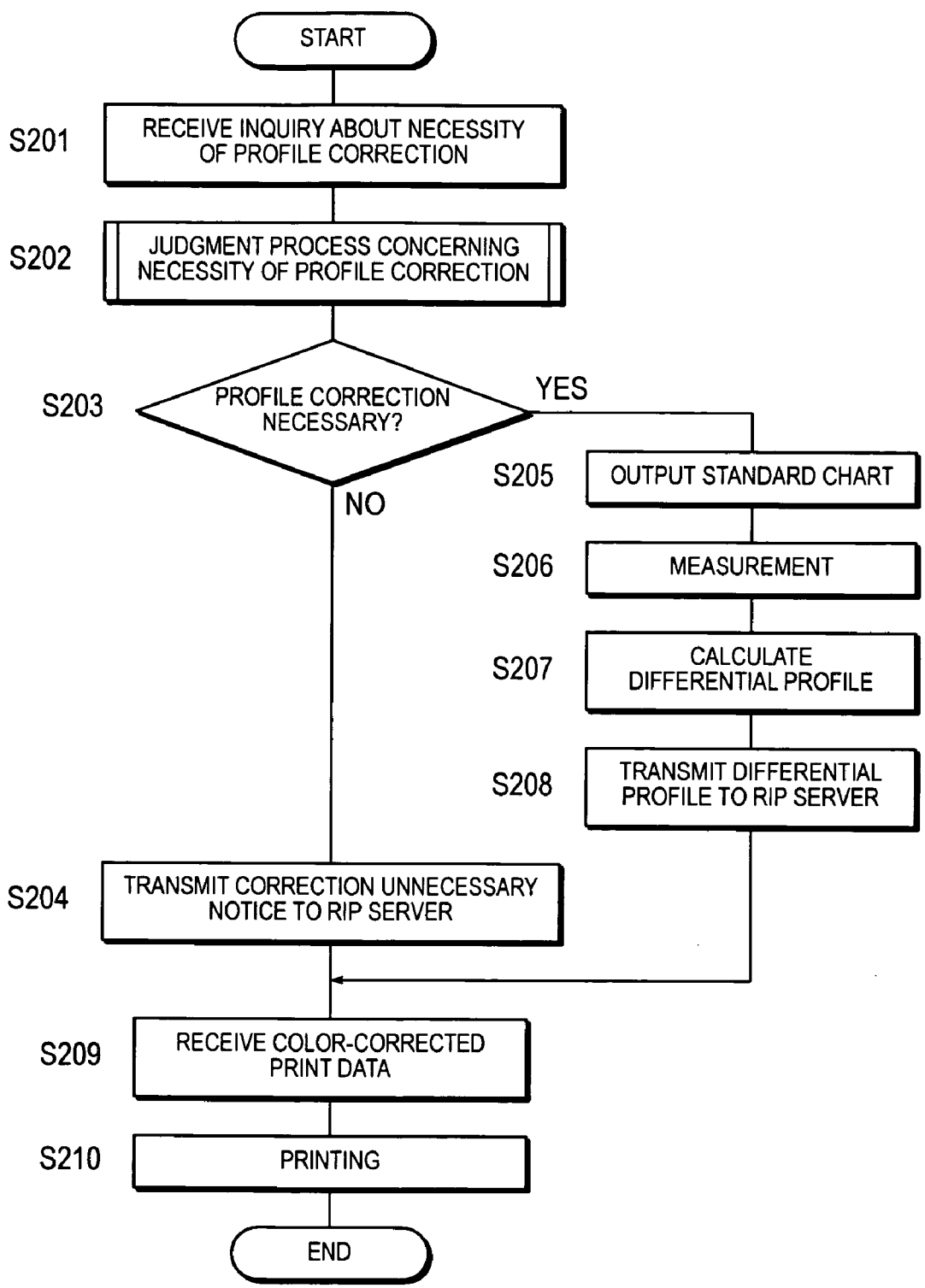
FIG. 10 is a flowchart showing the sequence of the process on the MFP.
Figure 11:
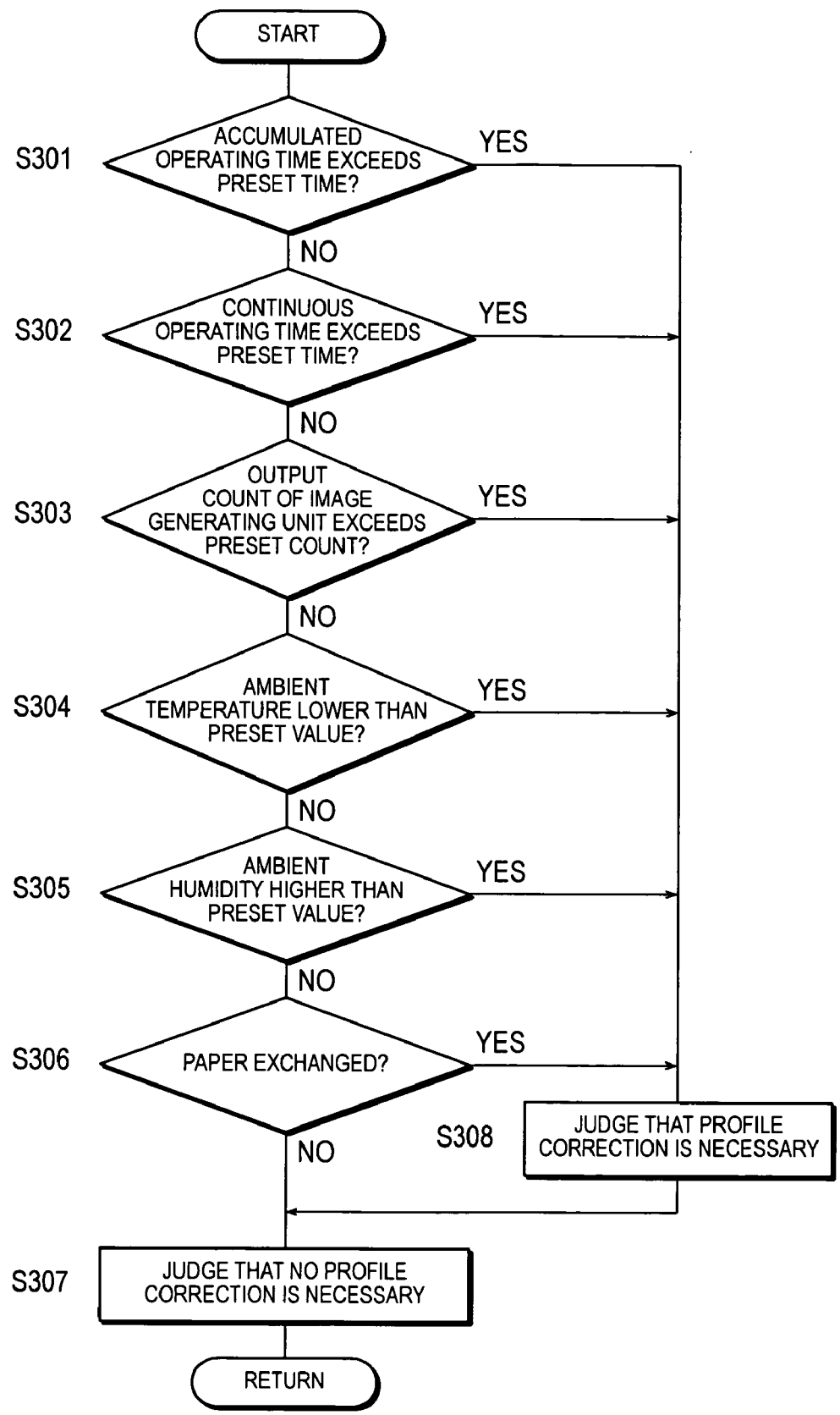
FIG. 11 is a flowchart showing the sequence of the judgment process as to the necessity of profile correction on the MFP.

FIG. 10 and FIG. 11 represent a flowchart showing the sequence of the process on the MFP 300. The algorithm shown in the flowchart of FIG. 10 and FIG. 11 is stored as a program in a storage unit such as the hard disk 303 of the MFP 300 and executed by the CPU 301.

When an inquiry about the necessity of profile correction is received from the RIP server 200 (step S201), the MFP 300 recognizes the internal condition of the MFP 300 based on the information managed by the status management unit 354 and executes a judgment process concerning the necessity of the correction of the profile (step S202). As can be seen from the above, the process is executed at an optimum timing in accordance with actual needs, as the judgment is made just when the inquiry at the time of the printing instruction is received from the RIP server 200. This minimizes the number of executions of the measuring operation by the image measuring unit 310 (refer to step S206) in the MFP 300. The details of the judgment process shall be described later.

When it is judged that the profile is not needed to be corrected (step S203: No), the MFP 300 transmits a notice that the profile correction is not needed to the RIP server 200 (step S204), and the program advances to the step S209.

On the other hand, if it is judged that the profile correction is needed (step S203: Yes), the MFP 300 prints out on paper the standard chart 363 for correction held in the hard disk 303 prior to the normal printing (step S205), and measures the output result of the standard chart 363 using the image measuring unit 310 (step S206). The invention can be constituted in such a way that the standard chart 363 is printed out, not on paper, but on other output targets such as a photoconductive body, and the output result is measured by the image measuring unit 310. In this case, the corresponding relation between the output result on paper and the output result on a photoconductive body needs to be known.

Next, the MFP 300 calculates the differential profile 362 based on the difference between the data obtained by measuring the output result of the standard chart 363 and the standard profile 361 (step S207), and transmits the calculated differential profile 362 to the RIP server 200 (step S208). Thus, it is possible to reduce the data quantity to be transferred by transmitting the differential profile 362. However, the MFP 300 is possible to transmit to the RIP server 200 the correction profile that can be used for color correction by itself, which is obtained by correcting the standard profile 361 based on the measurement result.

In the step S209, color-corrected print data is received from the RIP server 200 (step S209). Next, the color-corrected print data thus received is printed on paper (step S210).

Let us now describe the judgment process as to the necessity of profile correction on the MFP 300 referring to FIG. 11.

Color-affecting factors among the condition concerning the MFP 300 include the elapsed time concerning the equipment life, the operating time since the power was turned on, the condition of consumable items in the image forming unit 308, and the surrounding environment. Therefore, a function to recognize all these factors and reflect the result of the recognition becomes necessary. As to the surrounding environment, in particular, temperature and humidity of the operating environment of the equipment substantially affect the printing result in case of the electronic photography, so that sensors (not shown) for detecting them are built into the MFP 300. Another factor that affects color is the type of paper to be used for printing. If the type of paper cannot be used appropriately as management information, a judgment "profile correction is necessary" can be made when paper exchange occurs. These factors that affect color can be grasped and managed by the status management unit 354. FIG. 11 shows the examples of judgment items concerning the above-mentioned factors, and the flowchart shown in FIG. 11 may include other judgment items not shown there or may lack a portion of the judgment items shown there.

As shown in FIG. 11, it is judged in the present embodiment that it is necessary to correct the profile (step S308) when either the accumulated operating time of the MFP 300 is more than the preset time (step S301: Yes), the continuous operating time of the MFP 300 is more than the preset time (step S302: Yes), the output counts of the image forming unit 308 of the MFP 300 is more than the preset count (step S303: Yes), the ambient temperature is lower than the preset value (step S304: Yes), the ambient humidity is higher than the preset value (step S305: Yes), or the paper contained in the paper feeding unit 307 is exchanged (step S306: Yes). On the other hand, if neither of the conditions mentioned above exists (steps S301 through S306: No), it is judged that no profile correction is necessary (step S307).

As shown above, the MFP 300 makes a judgment in the present embodiment as to whether it is necessary to correct a profile, which is information concerning reproduction characteristics of print data, and, if it is judged that the profile correction is necessary, the MFP 300 outputs a predetermined standard chart, measures the output result using the image measuring unit 310 provided on the MFP 300, calculates the differential profile, i.e., the correction data, based on the measurement result, and transmits the calculated differential profile to the RIP server 200. The RIP server 200 then corrects the profile based on the differential profile received from the MFP 300.

In other words, the portion that performs color correction using the profile and the portion that measures the output color are separated in the present embodiment, and the color correction portion is built into the RIP server 200, which is in charge of generating the print data in a bitmap format, while the output color measurement portion is built into the MFP 300, which is in charge of executing the printing. Therefore, the color correcting portion (RIP server) acquires the differential profile when a printing instruction is issued so that it is not necessary for the RIP server side to manage the condition unique to the printing execution portion (MFP). The printing execution portion (MFP) is therefore capable of managing on its own condition that can affect the color reproducing characteristics. As a result, the RIP server is freed from the duty of monitoring the MFP's condition, and becomes capable of conforming to systems of more universal uses.

Thus, the present embodiment makes it possible to properly and efficiently correct the information concerning reproduction characteristics of the print data while reflecting the condition such as environment and durability of the printing device such as an MFP that can affect color reproduction characteristics. Hence it maintains stable reproduction characteristics.

It is obvious that this invention is not limited to the particular embodiments shown and described above but may be variously changed and modified without departing from the technical concept of this invention.

For example, although an MFP is mentioned as the printing device in the above embodiment, other printing devices such as a copying machiner and a printer can be used in this invention.

Moreover, although correction of information concerning color reproduction characteristics of the print data was discussed in the above embodiments, the present invention is not limited to it. The present invention is applicable not only to color reproduction characteristics but also to gray scale reproduction characteristics. In other words, the present invention is applicable to the correction of information concerning density reproduction characteristics of the print data.

Also, although it is described in the above embodiments that the MFP makes a judgment as to whether correction of information concerning reproduction characteristics is necessary or not when the RIP server inquires the MFP about the condition of reproduction characteristics when a printing instruction is issued, the present invention is not limited to it. For example, the MFP can make a judgment on its own as to whether the information concerning reproduction characteristics is necessary and transmit the correction data such as the differential profile to the RIP server when it judges that the correction is necessary.

The means and method of conducting various processes in the image processing system according to the present invention can be realized by means of a dedicated hardware circuit, or a programmed computer. Said program can be provided either by a computer readable recording medium such as a flexible disk and a CD-ROM, or by being supplied on-line via a network such as the internet. In this case, the program recorded on the computer readable recording medium is normally transferred to and stored in a storage unit such as a hard disk. Said program can also be provided as independent application software or can be built into the software of the device as a part of its function.

What is claimed is:

1. An image processing method comprising the steps of:
   1) making, by a printing device, a judgment as to whether any correction of information concerning reproducing characteristics of print data is necessary or not;
   2) outputting, from said printing device, a preset image when it is judged that it is necessary to correct the information concerning the reproduction characteristics in the step 1);
   3) measuring, by said printing device, the output result in the step 2) using a measuring unit provided on said printing device;
   4) calculating, by said printing device, correction data based on the measurement result in the step 3);
   5) transmitting said correction data calculated in the step 4) from said printing device to a printing control device; and
   6) correcting, by said printing control device, information concerning the reproduction characteristics based on said correction data received from said printing device.

2. An image processing method as claimed in claim 1, further comprising the steps of:
   7) inquring from said printing control device to said printing device when a printing instruction is received about the condition concerning said printing device that may affect the reproduction characteristics;
   wherein, when the condition inquiry is received, said printing control device makes a judgment as to whether any correction of the information concerning the reproduction characteristics is necessary or not in the step 1).

3. An image processing method as claimed in claim 1, wherein
   said correction data is a differential data for standard information concerning the reproduction characteristics.

4. An image processing method as claimed in claim 1, wherein
   said reproduction characteristics are color reproduction characteristics.

5. An image processing method as claimed in claim 1, wherein
   said reproduction characteristics are density reproduction characteristics.

6. An image processing system, comprising:
   a printing control device for transmitting print data; and
   a printing device for printing the print data received from the printing control device,
   said printing device including:
   a first communication unit for communicating with said printing control device;
   an output unit for outputting preset image when it is judged that correction of information concerning reproduction characteristics of print data is necessary;
   a measuring unit for measuring a result outputted by said output unit; and
   a first control unit for calculating correction data based on the result measured by said measuring unit and transmitting the calculated correction data to the printing control device via said first communication unit,
   said printing control device including:
   a second communication unit for communicating with said printing device; and
   a second control unit for correcting the information concerning reproduction characteristics based on said correction data received from said printing device via said second communication unit.

7. An image processing system as claimed in claim 6, wherein
   said second control unit of said printing control device inquires said printing device when a printing instruction is received about the condition concerning said printing device that may affect the reproduction characteristics;
   said output unit of said printing device outputs preset image when the condition inquiry is received from said printing control device and when it is judged that correction of the information concerning the reproduction characteristics is necessary.

8. An image processing system as claimed in claim 6, wherein
   said correction data is a differential data for standard information concerning the reproduction characteristics.

9. An image processing system as claimed in claim 6, wherein
   said reproduction characteristics are color reproduction characteristics.

10. An image processing system as claimed in claim 6, wherein
    said reproduction characteristics are density reproduction characteristics.

* * * * *